United States Patent Office 3,459,387
Patented Aug. 5, 1969

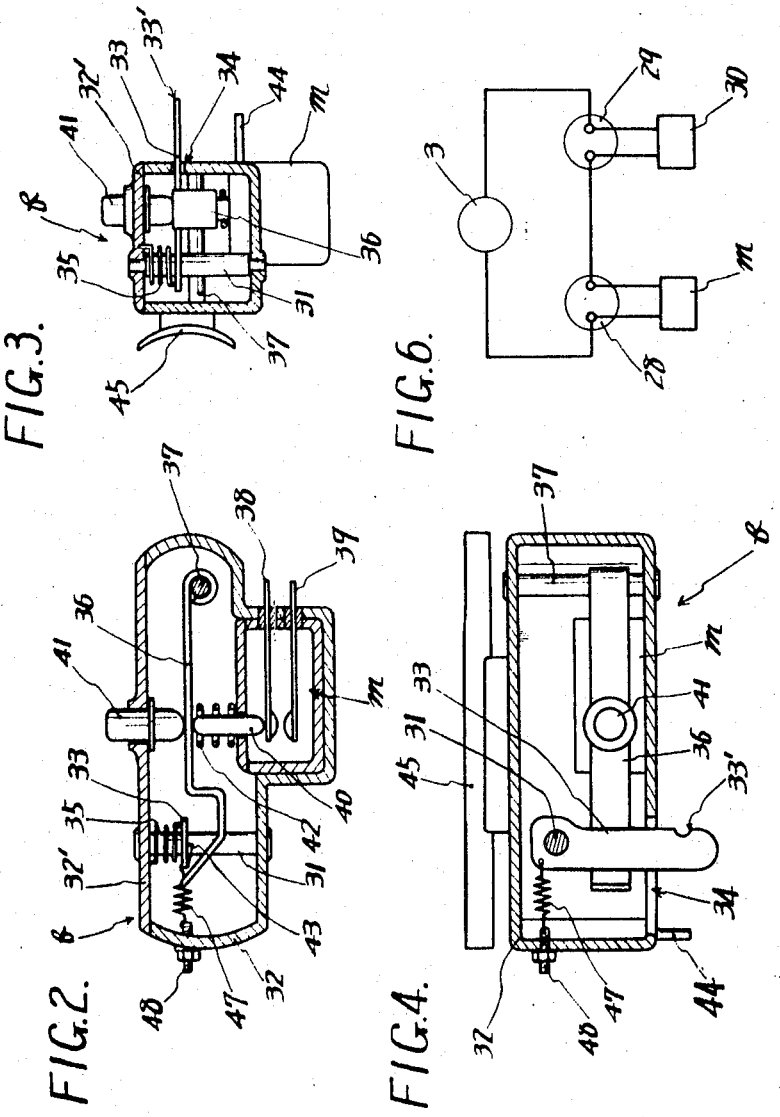

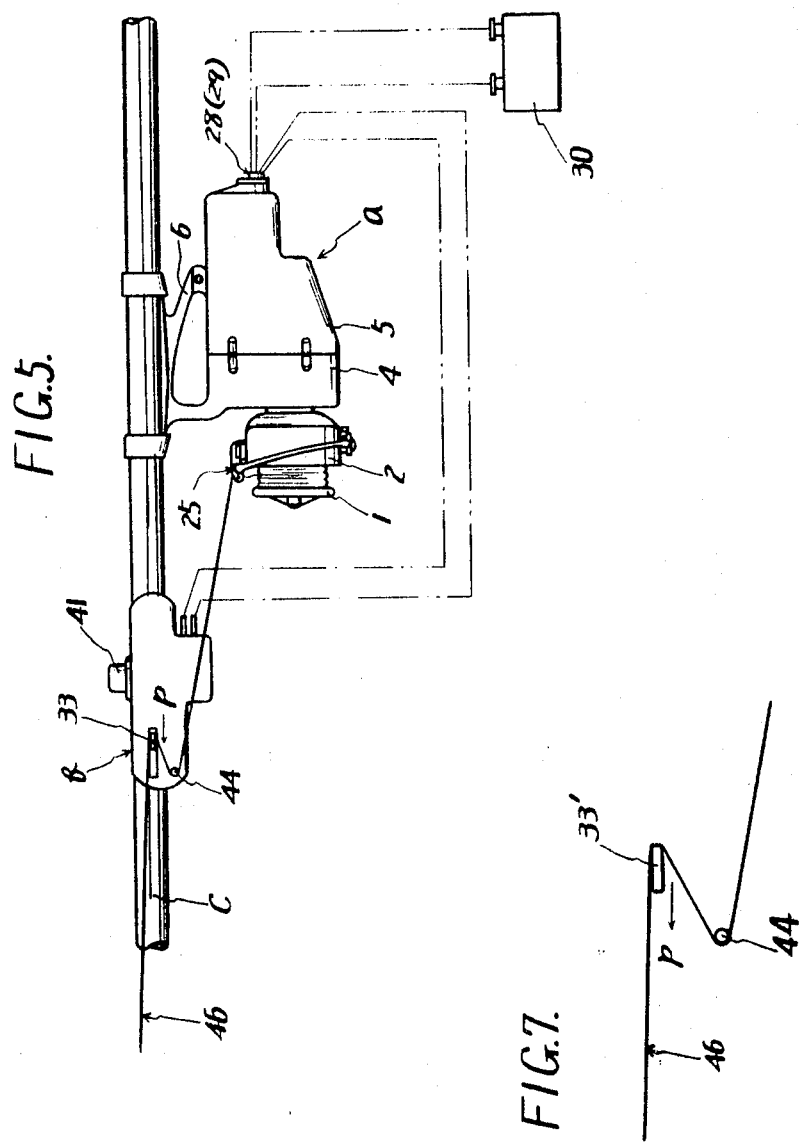

3,459,387
MOTORIZED FISHING REEL
Toshiaki Miyamae, 292 Nishi-Iwata, Higashi-Osaki-shi,
Osaka-fu, Japan
Filed Feb. 20, 1967, Ser. No. 617,389
Int. Cl. A01k 89/00
U.S. Cl. 242—84.21                    2 Claims

ABSTRACT OF THE DISCLOSURE

An electric motor is employed in a fishing reel to rotate a flyer about a reciprocated spool to retrieve the line. A switching attachment connected to the fishing rod forward of the reel uses a line engaging lever disposed to be pivoted by a pull on the line to cam an associated lever into a switch closing position to operate the motor to retrieve a hooked fish.

---

The present invention relates to a motorized fishing reel, and more particularly to an electric power driven fishing reel which is capable of instantly detecting the pulling of the fishing line with more than a predetermined force, when the fish catches the bait, so that the line may immediately start to be rolled up.

With the conventional fishing rod, it has been a common practice to use a buoy or a ring, whenever the bait is touched by the fish. It is neither easy nor convenient for the fisher, however, to constantly watch the buoy and judge the touched conditions of the line by the changing movements of the buoy, so as to be able to draw up the line immediately. Particularly during the night time or when the fish-hook is thrown out about 100 meters or in case of fishing with a rod with its hook casting along the current, it is hardly possible for him to closely watch over the movements of the buoy.

One of the principal objects of the present invention is to overcome the above-mentioned drawbacks of the conventional fishing reel by providing a motorized fishing reel, which, by causing the line, when it is led to the spool cup from the tip of the fishing rod, to pass a suspending lever of the line, which is controlled such, that it will never turn when the line is tautened by a fish with less than a predetermined force, but it will always turn, whenever drawn by a force, which is greater than a predetermined force, so that a switch may be closed to operate a torque motor and the spool cup, so as to automatically wind up the line on the spool.

It is another object of the present invention to arrange the spool cup at the tip of a cylindrical axle, which is driven to rotate by a torque motor, while the shaft, which slides in the cylindrical axle and the spool cup is provided likewise at the tip of the shaft, so that by the cylindrical axle and the shaft, respectively, which are arranged to be concentric relative to each other, the spool cup may be rotated and the spool will slide in the above-mentioned manner.

With these and other objects in view, which will become apparent in the following detailed description, the present invention will be clearly understood, as disclosed by example, in connection with the accompanying drawings, in which:

FIGS. 2–4 are, respectively, sectional views, namely a front view and a plan view, which illustrate the interior structure of the switch element;

FIG. 5 is an elevation illustrating the condition, wherein the body of the reel and switch element are fixed on the fishing rod;

Figure 1:
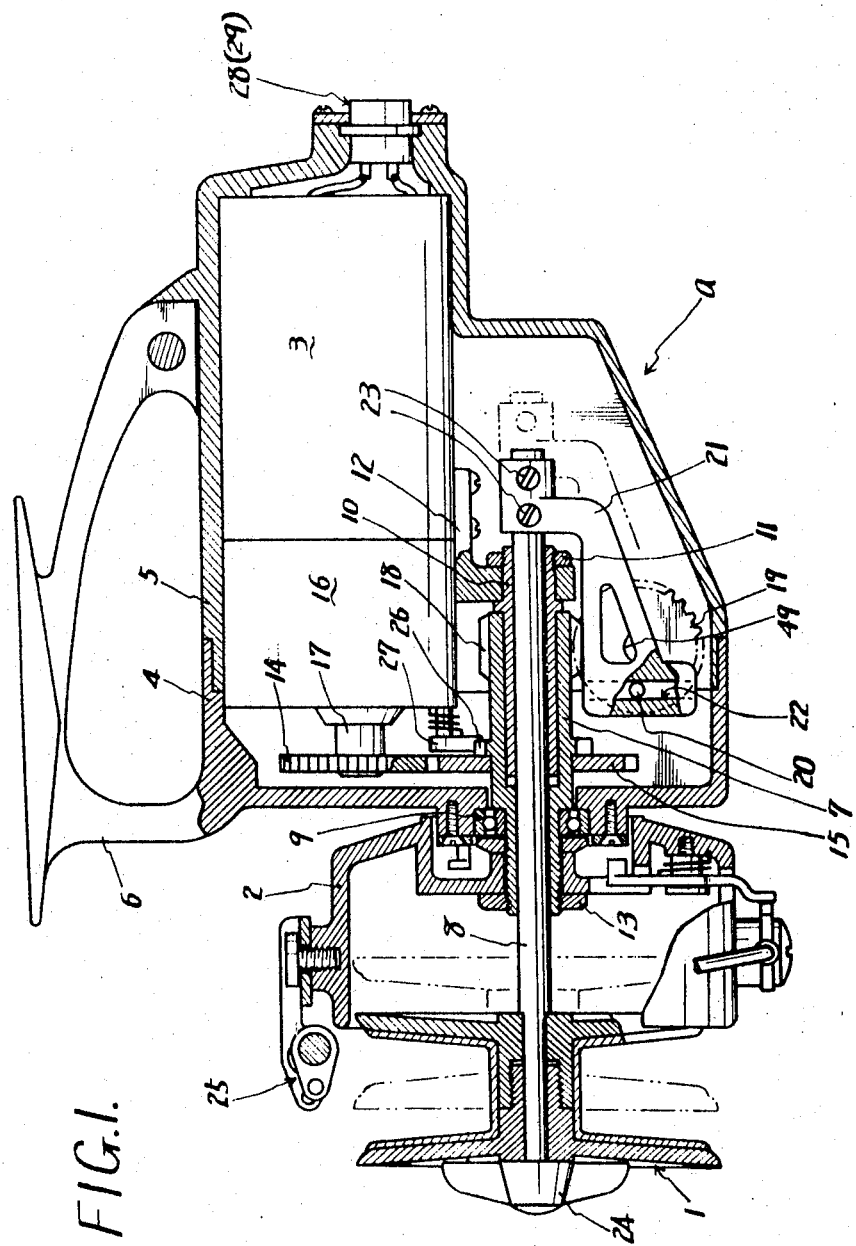
FIGURE 1 is an elevation partly in section, which illustrates the interior structure of the body of the fishing reel, according to the present invention.

FIG. 6 discloses the electric circuit of the motor; and
FIG. 7 indicates the condition, wherein the fishing line is held by its suspending lever.

Referring now to the drawings, the motorized fishing reel, according to the present invention comprises, roughly speaking, a hollow body $a$ which is composed of a spool 1, a spool cup 2 and a torque motor 3, and a switch element $b$ which consists of a line suspending lever 33 and electric contacts 38, 39, which close the motor circuit as soon as the line suspending lever 33 rotates.

The switch element $b$ is separately constructed, so as to position it more frontward than the body $a$ when the switch element $b$ is fit on the fishing rod. The body $a$ is arranged on the rod $c$ by means of a fixing element 6 attached to the upper part of a case 4, 5, while the switch element $b$ is likewise fixed to the rod $c$ through the fixing arm 45 projected from one side of the covering case 32.

The body $a$ is constructed as follows:
A cylindrical axle 7, into which is thrusted a concentric sliding shaft 8, is provided and its front end portion is rotationally held by a radial ball bearing 9, while its rear end part is likewise sandwiched by a cylindrical bearing metal 10, which is held between the cylindrical axle 7 and the sliding shaft 8, and the rear end of the bearing metal 10 is fit on the securing member 12 by means of a nut 11, so that it may work as a bearing for the sliding shaft 8.

On the other hand, the spool cup 2 is arranged at the tip of the cylindrical axle 7 by a nut 13, so that it may likewise rotate, as the axle 7 turns. On the periphery of the central part of the cylindrical axle 7 is secured a gear 15 which meshes with a gear 14 of the motor element, which is secured to an output shaft 17 of the reduction gear element 16, and whenever the torque motor 3 rotates, the cylindrical axle 7 will also rotate by means of the gears 14, 15 and the reduction gear element 16.

On the periphery of the rear end part of the axle 7 is arranged a worm 18, which meshes a worm wheel 19 provided on the lower part of said shaft, while the pin 20 is projected from the side of the said worm wheel 19, to be fit into a cam hole 22 which is made at one end of the arm lever 21 to be vertically long. The other end part of the lever 21 extends upwardly to be fixed on the rear end of the sliding shaft 8 by means of screws 23, whenever the worm wheel 19 rotates, the sliding shaft 8 will slide right and left, respectively, of the pin 20 and cam hole 22.

The spool 1 is secured to the tip of the sliding shaft 8 by means of a nut 24. In the accompanying drawings, a guide lever 25 of the line is arranged on the periphery of the spool cup 2, while an anti-reverse means including a ratchet 26 having a pawl is fit on the periphery of the cylindrical axle 7, is adapted to prevent the cylindrical axle 7 from its reverse rotation at the point 27, both plug receptacles for the electric cords, which come out of the switch element $a$ and the batteries 30, at the point 28 and 29, respectively, the shaft 49, on which the worm wheel 19 is arranged.

The switch element $b$ is provided as follows:
A vertical shaft 31 is provided, which is fit in the interior of a covering case 32 to be freely rotational, and on its upper part is horizontally secured to a line suspending lever 33, the tip of which projects out of the sideways hole 34 provided in the side wall of the covering case 32, so that the line suspending element 33' may be formed.

On the other hand, upon the rear end of the line suspending lever 33 are fixed a coil spring 35, which controls the rotation of the lever 33, and a spring 47 for adjusting the control. The upper end of the spring 35 is secured to a cover 32' of the covering case 32, while its lower end is connected to the line suspending lever 33. The spring 47 is arranged between the line suspending lever 33 and a bolt 48 for controlling elasticity which is put from outside into the interior of the covering case 32. The line suspending lever 33 is usually controlled by the springs 35, 47 and it projects out of the covering case 32 to be nearly perpendicular to its side wall. It will rotate within the hole 34, whenever driven by more than a certain strength.

A subsidiary lever 36, the rear end of which is rotatably mounted on a lateral shaft 37, will be pushed downward with the lateral shaft as the center, when the line suspending lever 33 will be rotated forward. Beneath the subsidiary lever 36 is arranged a microswitch m with electric contacts 38, 39, which face each other above and below and when the lever 36 is pushed downwardly, the contact 38 will be pushed by the working pin 40, so that it may engage the other contact 39.

A press button 41 for the manual operation is provided on the lever 36. A spring 42 is arranged for the lever 36, a lug 43 is projected from the lower side of the line suspending lever 33 and a pin 44 is provided which is projected from a side wall of the covering case to suspend the line. It is arranged to be below and in front of the line suspending lever 33.

When using the fishing reel, according to the present invention, its body element a is first attached to the fishing rod c, while the switching element b is provided forward of the body element a and the torque motor 3 of the body element a, the microswitch m of the switching element b and the batteries 30 are connected in a series by means of the plugs 28, 29, so as to complete the electric circuit.

On the other hand, the line 46 (FIG. 7), coming out of the tip of the fishing rod c, will be rolled up by the spool 1, after passing through, as shown by FIGS. 5 and 7, the line suspending element 33' of the line suspending lever 33, the pin 44 for the suspension of the line, which is projected out of the side wall of the covering case 32, and the guide lever 25 which is arranged on the spool cup 2. When using the fishing reel in the above-mentioned way, the line suspending lever 33 will rotate around the shaft 31 in the direction of the arrow p, shown in FIG. 5, against the resistance of the springs 35 and 47, as soon as the line 46 is pulled by a fish, so that the subsidiary lever 36 will be pushed down about the lateral shaft 37 against the resistance of the spring 42, while at the same time the working pin 40 is pushed upwardly by the subsidiary lever 36 and consequently both contacts 38 and 39 engage each other. The motor 3 will then start to rotate as the battery 30 is operatively connected with the motor 3 by means of a microswitch m. The rotation of the motor 3 brings about rotation of the cylindrical axle 7 and thereby of the spool cup 2, and the line 46 will be rolled up on the spool 1 with the aid of the guide lever 25.

Since the above-mentioned electric operation of the reel, according to the present invention, will take place instantly, as soon as the line 46 is touched by a fish, the line 46 will be pulled towards the body element a, and no time-lag occurs such as it is experienced in case of a conventional reel, so that the fish has no chance to escape. Besides, the line suspending lever 33 will also turn in the direction of the arrow p, when the line 46 is pulled by the fish toward the body element a, as the motor 3 starts to rotate. Thus, when the line 46, which is led from the tip of the fishing rod c to the guide lever 25, is pulled, it becomes strained to be straight, so that the line suspending lever 33 will turn in the direction of the arrow p. If the contacts 38 and 39 are arranged in such a manner, that they contact each other, when the line suspending lever 33 comes to a position, where it performs a slight turning, the motor 3 will start immediately, if the pull on the line 46 by the fish is weak and slight. As soon as the motor 3 starts to rotate, the line suspending lever 33 will be driven to rotate without fail by the force of the motor 3 to roll up the line until the line suspending lever 33 comes to a predetermined position.

When the line suspending lever 33 rotates to arrive at a predetermined position, the lug 43, projecting from the lower side of the lever 33, will be connected with the tip of the subsidiary lever 36, so that the subsidiary lever 36 will be continuously pressed downwardly and both contacts 38 and 39 will be maintained in their mutually contacting position, and the motor 3 will also be continuously operative and the line 46 will be rolled up during the rotation of the spool cup 2. Since the line 46, which is rolled up against the pull by the fish, will be strained, it will automatically leave the line suspending lever 33, which has turned and inclined and, passing below the pin 44, the line 46 will be fed directly to the guide lever 25 of the spool cup 2. In other words, even though the line 46 is fit on the line suspending lever 33 and pin 44, it will automatically leave to be fed to the guide lever 25 directly, as soon as the operation starts.

On the other hand, when the spool cup 2 turns round, i.e., when the cylindrical shaft 7 rotates, the worm wheel 19 will also turn by means of the worm 18, so that the pin 20 projecting from the worm wheel 19, the arm lever 2 operatively connected with the pin 20 and the spool 1 will slide to the right and to the left respectively by means of the sliding shaft 8. As a result, the line 46 will be evenly wound on the spool cup 2 due to the guide lever 25 which rotates together with the spool cup 2. Even if the diameter of the spool 1 is small, it can wind thereon a long line in regular manner, so that it can be smoothly unwound again if required.

The above-mentioned characteristical advantages of the present invention result from the following structure of the reel: While the spool cup 2 is mounted on the tip of the cylindrical axle 7, the sliding shaft 8 is concentrically disposed in the cylindrical axle 7 and the spool 1 is provided on the tip of the sliding shaft 8. Such a structure has the merit, that the set-up for holding both the spool 1 and the spool cup 2, the gearing mechanism to rotate the spool cup 2, and also the gearing mechanism to cause a sliding of the spool in axial direction, are composed in a single body and furthermore the spool cup 2 can smoothly rotate, since the force exerted upon the spool cup 2 by the guide lever 25 while winding up the line 46 is assumed and divided between the radial ball bearing 9 and the cylindrical bearing metal 10 by means of the cylindrical axle 7, which receives the sliding shaft 8, the entire structure will never be overloaded in any of its particular parts.

Besides, since the motor 3 is a torque motor, a very high torque can be generated, when starting the motor 3, while its rotation will automatically slow down, as soon as it is overloaded, so that the reel can be operated according to the pulling force of the fish. For instance, if a larger fish pulls on the line 46, the motor 3 will operate at a lower speed and again at a higher speed; if a smaller fish exerts a pull, so that the line 46 will never be overloaded and the fish can be safely hooked up.

Upon stopping the winding of the line 46, the press button 41 is pushed continuously to remove the lug 43 from the tip of the subsidiary lever 36, and after returning of the line suspending lever 33 by the force of the springs 35 and 47 to its original position, which is in the direction angular to the side wall of the covering case 32, the press button 41 will be released, so that by the spring 42 the subsidiary lever 36 will be pushed back and the contacts 38 and 39 will be spaced apart from each other, thereby severing the electrical connection of the motor 3 from the battery 30, so as to stop the winding of the line 46.

When the motor 3 is at a standstill, the contacts 38 and 39 will contact each other by means of the subsidiary lever 36 and the working pin 40, if the press button 41 is pushed and the motor 3 is manually started whenever necessary. Thus the winding of the line 46 when the bait is secured to the hook, the adjustment of length of the line 46 or the winding required upon hooking up the fish can be easily and freely performed.

What is claimed is:
1. A fishing reel, comprising:
a fishing rod,
a hollow body secured to said fishing rod and including:
- a spool, a spool cup and a torque motor,
- a switch element secured to said fishing rod in front of said hollow body and having a line suspending lever rotatably mounted therein and electric contacts, as well as means for closing said electric contacts upon rotation of said line suspending lever,
- a hollow cylindrical axle rotatably mounted in said hollow body,
- a shaft slidingly received in said hollow cylindrical axle,
- said spool cup being secured to the front end of said hollow cylindrical axle for joint rotation therewith,
- a ratchet and pawl disposed on the periphery of said cylindrical axle and permitting rotation of the latter in one direction only,
- gear means including a worm wheel for transmitting the torque of said motor to said hollow cylindrical axle for rotation of the latter,
- said switch element including a vertical shaft and carrying said line suspending lever,
- at least one spring controlling the rotation of said line suspending lever, and
- an additional shaft,
- a subsidiary lever rotatably mounted on said additional shaft and having a portion to be engaged by and pushed downwardly upon forward rotation of said line suspending lever,
- a microswitch including said electric contacts and disposed below said subsidiary lever, and
- said line suspending lever having a recess receiving said line and being turned by the pull of said line and thereby pushing said subsidiary lever and operating said microswitch to thereby release the line and operate the torque motor.

2. The fishing reel, as set forth in claim 1, which includes:
means for adjusting the force of said at least one spring for varying its force exerted on said line suspending lever.

References Cited

UNITED STATES PATENTS

| | | | |
|---|---|---|---|
| 2,303,668 | 12/1942 | Tilbury | 242—84.3 |
| 2,541,876 | 2/1951 | Lockwood | 43—21 |
| 2,899,768 | 8/1959 | Steinauer | 43—15 |
| 3,252,239 | 5/1966 | Moeller | 43—21 |
| 3,348,788 | 10/1967 | Vinokur | 242—84.21 |
| 3,352,507 | 11/1967 | Boussageon | 242—84.21 |

BILLY S. TAYLOR, Primary Examiner

U.S. Cl. X.R.

43—15, 21; 242—84